United States Patent
Itoh et al.

(10) Patent No.: US 10,079,930 B2
(45) Date of Patent: Sep. 18, 2018

(54) INFORMATION PROCESSING APPARATUS, INFORMATION PROCESSING SYSTEM, AND INFORMATION PROCESSING METHOD

(71) Applicants: Masahiko Itoh, Kanagawa (JP); Tsutomu Kawase, Kanagawa (JP); Hiroyoshi Kuroda, Kanagawa (JP); Yuji Ohue, Kanagawa (JP)

(72) Inventors: Masahiko Itoh, Kanagawa (JP); Tsutomu Kawase, Kanagawa (JP); Hiroyoshi Kuroda, Kanagawa (JP); Yuji Ohue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/155,203

(22) Filed: May 16, 2016

(65) Prior Publication Data
US 2016/0352890 A1  Dec. 1, 2016

(30) Foreign Application Priority Data
May 26, 2015  (JP) ................. 2015-106766

(51) Int. Cl.
H04W 24/06 (2009.01)
H04M 1/725 (2006.01)
H04W 4/02 (2018.01)

(52) U.S. Cl.
CPC ....... *H04M 1/72572* (2013.01); *H04W 4/023* (2013.01)

(58) Field of Classification Search
CPC .................................................. H04W 24/06
USPC ..................... 455/41.2, 67.14, 557
See application file for complete search history.

(56) References Cited

U.S. PATENT DOCUMENTS

| | | | | |
|---|---|---|---|---|
| 6,934,689 B1 * | 8/2005 | Ritter | ...... | G06Q 20/04 705/16 |
| 7,155,305 B2 * | 12/2006 | Hayes | ...... | G05B 15/02 700/224 |
| 7,363,028 B2 * | 4/2008 | de Clerq | ...... | G05B 15/02 370/252 |
| 7,440,767 B2 * | 10/2008 | Ballay | ...... | G06F 3/0231 455/41.2 |

(Continued)

FOREIGN PATENT DOCUMENTS

JP  2002269278 A  *  9/2002
JP  2009-198209       9/2009

OTHER PUBLICATIONS

English Translantion of JP2002269278A, Aug. 8, 2017.*

*Primary Examiner* — William D Cumming
(74) *Attorney, Agent, or Firm* — IPUSA, PLLC

(57) ABSTRACT

An information processing apparatus is provided that includes a processor coupled to a memory and configured to execute steps of storing corresponding information associating a predetermined event with apparatus information of an output apparatus, among the plurality of output apparatuses, that is installed at a predetermined position, and a control to be implemented with respect to the output apparatus; collecting event information relating to the predetermined event that is occurring; selecting the control to be implemented with respect to the output apparatus based on the collected event information; and instructing the output apparatus to implement the selected control.

12 Claims, 17 Drawing Sheets

(56) References Cited

U.S. PATENT DOCUMENTS

| | | | |
|---|---|---|---|
| 2003/0080707 A1* | 5/2003 | Paris | G05B 5/01 |
| | | | 318/560 |
| 2005/0159823 A1* | 7/2005 | Hayes | G05B 15/02 |
| | | | 700/19 |
| 2005/0177442 A1* | 8/2005 | Sullivan | G06Q 10/087 |
| | | | 705/16 |
| 2006/0112419 A1* | 5/2006 | Brown | H04L 63/0428 |
| | | | 726/5 |
| 2008/0002025 A1* | 1/2008 | Kakinami | B60R 1/00 |
| | | | 348/115 |
| 2008/0108388 A1* | 5/2008 | Ebrom | D06F 39/005 |
| | | | 455/557 |
| 2008/0153423 A1* | 6/2008 | Armstrong | H04W 24/06 |
| | | | 455/67.14 |
| 2009/0059897 A1* | 3/2009 | Anantharaman | H04L 12/66 |
| | | | 370/352 |
| 2009/0172402 A1* | 7/2009 | Tran | G06Q 20/102 |
| | | | 713/170 |
| 2015/0085619 A1* | 3/2015 | Jeong | G08C 23/02 |
| | | | 367/198 |

* cited by examiner

FIG.8A

| OUTPUT APPARATUS ID | POSITION |
|---|---|
| SP0001 | POINT 1 |
| SP0002 | POINT 2 |
| SP0003 | POINT 3 |
| SP0004 | POINT 4 |
| SP0005 | POINT 5 |
| SP0006 | POINT 6 |
| SP0007 | POINT 7 |
| SP0008 | POINT 8 |
| SP0009 | POINT 9 |
| SP0010 | POINT 10 |
| SP0011 | POINT 11 |
| SP0012 | POINT 12 |

FIG.8B

| SENDER ID (APP ID) | OUTPUT APPARATUS ID | POSITION | ACQUISITION DATE/TIME |
|---|---|---|---|
| AP0001 | SP0003 | POINT 3 | 20xx/4/3 10:00 |
| AP0002 | SP0004 | POINT 4 | 20xx/4/3 9:30 |
| AP0003 | SP0005 | POINT 5 | 20xx/4/3 10:05 |
| ... | ... | ... | ... |

FIG.11

| OUTPUT APPARATUS ID | POSITION | AMBIENT SOUND LEVEL (0-10) | DETECTION OF MOVING OBJECT WITHIN PREDETERMINED TIME PERIOD | DETECTION OF PREDETERMINED INFORMATION |
|---|---|---|---|---|
| SP0001 | POINT 1 | — | — | — |
| SP0002 | POINT 2 | 7 | YES | — |
| SP0003 | POINT 3 | 5 | YES | — |
| SP0004 | POINT 4 | 5 | YES | — |
| SP0005 | POINT 5 | 9 | YES | AP0006 |
| SP0006 | POINT 6 | 5 | YES | — |
| SP0007 | POINT 7 | — | — | — |
| SP0008 | POINT 8 | 2 | NO | — |
| SP0009 | POINT 9 | 3 | YES | — |
| SP0010 | POINT 10 | 5 | YES | — |
| SP0011 | POINT 11 | — | — | — |
| SP0012 | POINT 12 | 0 | NO | — |
| ... | ... | ... | ... | ... |

| EVENT | OUTPUT APPARATUS ID | POSITION | CONTROL |
|---|---|---|---|
| LAYOUT A | SP0001 | POINT 1 | OUTPUT OFF |
| | SP0002 | POINT 2 | OUTPUT ON (NORMAL) |
| | SP0003 | POINT 3 | OUTPUT ON (NORMAL) |
| | SP0004 | POINT 4 | OUTPUT ON (NORMAL) |
| | SP0005 | POINT 5 | OUTPUT ON (NORMAL) |
| | SP0006 | POINT 6 | OUTPUT ON (NORMAL) |
| | SP0007 | POINT 7 | OUTPUT OFF |
| | SP0008 | POINT 8 | OUTPUT ON (NORMAL) |
| | SP0009 | POINT 9 | OUTPUT ON (NORMAL) |
| | SP0010 | POINT 10 | OUTPUT ON (NORMAL) |
| | SP0011 | POINT 11 | OUTPUT OFF |
| | SP0012 | POINT 12 | OUTPUT ON (NORMAL) |
| LAYOUT B | SP0001 | POINT 1 | OUTPUT OFF |
| | SP0002 | POINT 2 | OUTPUT OFF |
| | SP0003 | POINT 3 | OUTPUT ON (+3dB) |
| | SP0004 | POINT 4 | OUTPUT ON (+3dB) |
| | SP0005 | POINT 5 | OUTPUT ON (+3dB) |
| | SP0006 | POINT 6 | OUTPUT OFF |
| | SP0007 | POINT 7 | OUTPUT OFF |
| | SP0008 | POINT 8 | OUTPUT ON (+3dB) |
| | SP0009 | POINT 9 | OUTPUT ON (+3dB) |
| | SP0010 | POINT 10 | OUTPUT ON (+3dB) |
| | SP0011 | POINT 11 | OUTPUT OFF |
| | SP0012 | POINT 12 | OUTPUT OFF |
| ... | ... | ... | ... |

FIG.12B

| EVENT | OUTPUT APPARATUS ID | POSITION | CONTROL |
|---|---|---|---|
| OPENING TIME 10:00 | SP0001 | POINT 1 | OUTPUT ON (NORMAL) |
| | SP0002 | POINT 2 | OUTPUT ON (NORMAL) |
| | SP0003 | POINT 3 | OUTPUT ON (NORMAL) |
| | SP0004 | POINT 4 | OUTPUT ON (NORMAL) |
| | SP0005 | POINT 5 | OUTPUT ON (NORMAL) |
| | ... | ... | ... |
| CLOSING TIME 22:00 | SP0001 | POINT 1 | OUTPUT OFF |
| | SP0002 | POINT 2 | OUTPUT ON (NORMAL) |
| | SP0003 | POINT 3 | OUTPUT OFF |
| | SP0004 | POINT 4 | OUTPUT ON (NORMAL) |
| | SP0005 | POINT 5 | OUTPUT OFF |
| | ... | ... | ... |
| LATE EVENING 23:00 | SP0001 | POINT 1 | OUTPUT OFF |
| | SP0002 | POINT 2 | OUTPUT OFF |
| | SP0003 | POINT 3 | OUTPUT OFF |
| | SP0004 | POINT 4 | OUTPUT OFF |
| | SP0005 | POINT 5 | OUTPUT OFF |
| | ... | ... | ... |
| ... | ... | ... | ... |

FIG.13A

| EVENT | OUTPUT APPARATUS ID | POSITION | CONTROL |
|---|---|---|---|
| AMBIENT SOUND LEVEL HIGH (POINT 1) | SP0001 | POINT 1 | OUTPUT ON (+6dB) |
| AMBIENT SOUND LEVEL HIGH (POINT 2) | SP0002 | POINT 2 | OUTPUT ON (+6dB) |
| AMBIENT SOUND LEVEL HIGH (POINT 3) | SP0003 | POINT 3 | OUTPUT ON (+6dB) |
| AMBIENT SOUND LEVEL HIGH (POINT 4) | SP0004 | POINT 4 | OUTPUT ON (+6dB) |
| AMBIENT SOUND LEVEL HIGH (POINT 5) | SP0005 | POINT 5 | OUTPUT ON (+6dB) |
| ... | ... | ... | ... |
| AMBIENT SOUND LEVEL LOW (POINT 1) | SP0001 | POINT 1 | OUTPUT ON (NORMAL) |
| AMBIENT SOUND LEVEL LOW (POINT 2) | SP0002 | POINT 2 | OUTPUT ON (NORMAL) |
| AMBIENT SOUND LEVEL LOW (POINT 3) | SP0003 | POINT 3 | OUTPUT ON (NORMAL) |
| AMBIENT SOUND LEVEL LOW (POINT 4) | SP0004 | POINT 4 | OUTPUT ON (NORMAL) |
| AMBIENT SOUND LEVEL LOW (POINT 5) | SP0005 | POINT 5 | OUTPUT ON (NORMAL) |
| ... | ... | ... | ... |
| NO DETECTION OF MOVING OBJECT FOR PREDETERMINED TIME PERIOD | SP0002 | POINT 2 | OUTPUT OFF |
| | SP0004 | POINT 4 | OUTPUT OFF |
| | SP0006 | POINT 6 | OUTPUT OFF |
| | ... | ... | ... |
| DETECTION OF MOVING OBJECT | SP0002 | POINT 2 | OUTPUT ON (NORMAL) |
| | SP0004 | POINT 4 | OUTPUT ON (NORMAL) |
| | SP0006 | POINT 6 | OUTPUT ON (NORMAL) |
| | ... | ... | ... |
| ... | ... | ... | ... |

FIG.13B

| EVENT | OUTPUT APPARATUS ID | POSITION | CONTROL |
|---|---|---|---|
| DETECTION OF PREDETERMINED INFORMATION (POINT 1) | SP0001 | POINT 1 | OUTPUT ON BY AUDIBLE SOUND |
| DETECTION OF PREDETERMINED INFORMATION (POINT 2) | SP0002 | POINT 2 | OUTPUT ON BY AUDIBLE SOUND |
| DETECTION OF PREDETERMINED INFORMATION (POINT 3) | SP0003 | POINT 3 | OUTPUT ON BY AUDIBLE SOUND |
| DETECTION OF PREDETERMINED INFORMATION (POINT 4) | SP0004 | POINT 4 | OUTPUT ON BY AUDIBLE SOUND |
| DETECTION OF PREDETERMINED INFORMATION (POINT 5) | SP0005 | POINT 5 | OUTPUT ON BY AUDIBLE SOUND |
| ... | ... | ... | ... |
| NON-DETECTION OF PREDETERMINED INFORMATION (POINT 1) | SP0001 | POINT 1 | OUTPUT OFF BY AUDIBLE SOUND |
| NON-DETECTION OF PREDETERMINED INFORMATION (POINT 2) | SP0002 | POINT 2 | OUTPUT OFF BY AUDIBLE SOUND |
| NON-DETECTION OF PREDETERMINED INFORMATION (POINT 3) | SP0003 | POINT 3 | OUTPUT OFF BY AUDIBLE SOUND |
| NON-DETECTION OF PREDETERMINED INFORMATION (POINT 4) | SP0004 | POINT 4 | OUTPUT OFF BY AUDIBLE SOUND |
| NON-DETECTION OF PREDETERMINED INFORMATION (POINT 5) | SP0005 | POINT 5 | OUTPUT OFF BY AUDIBLE SOUND |
| ... | ... | ... | ... |

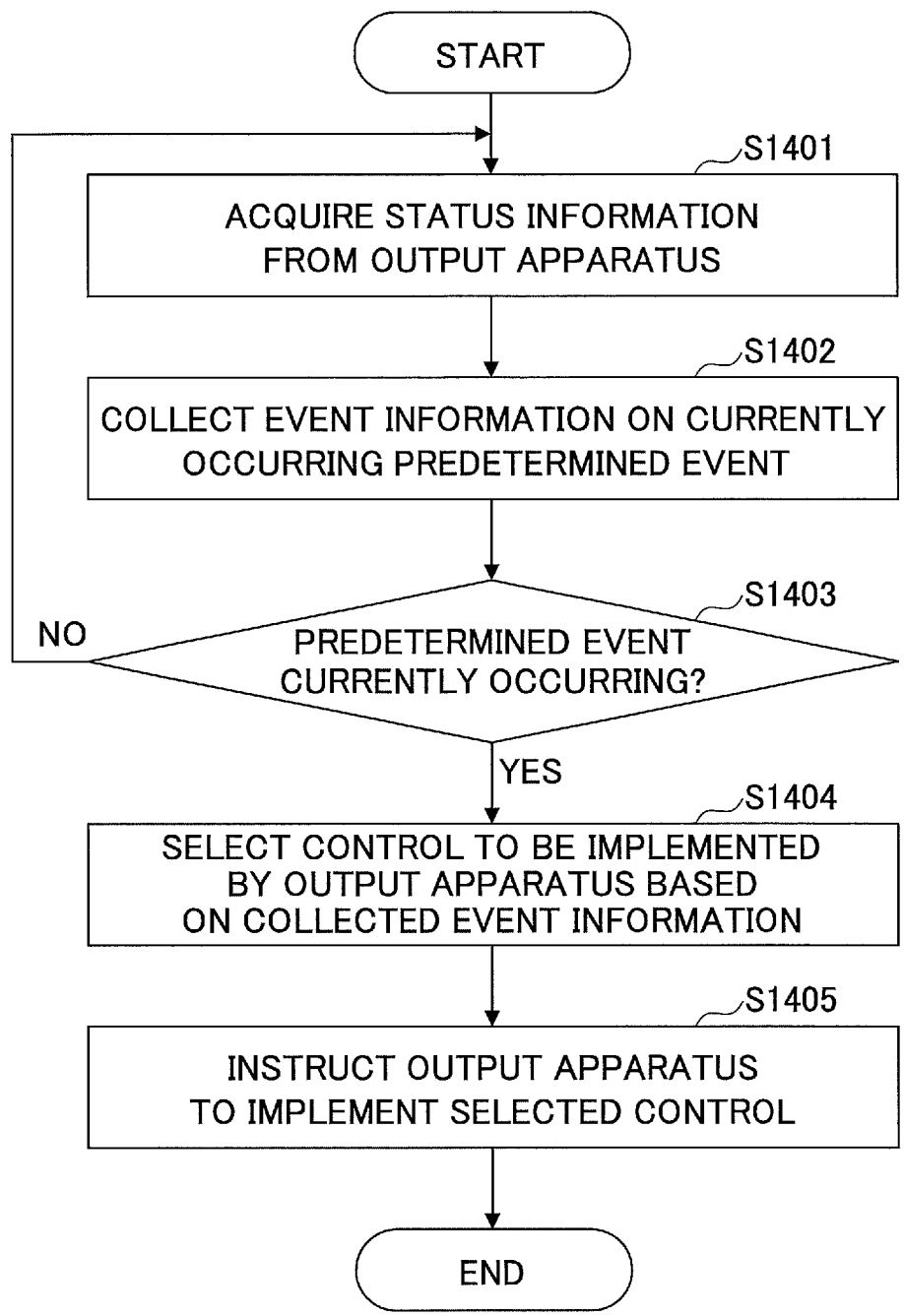

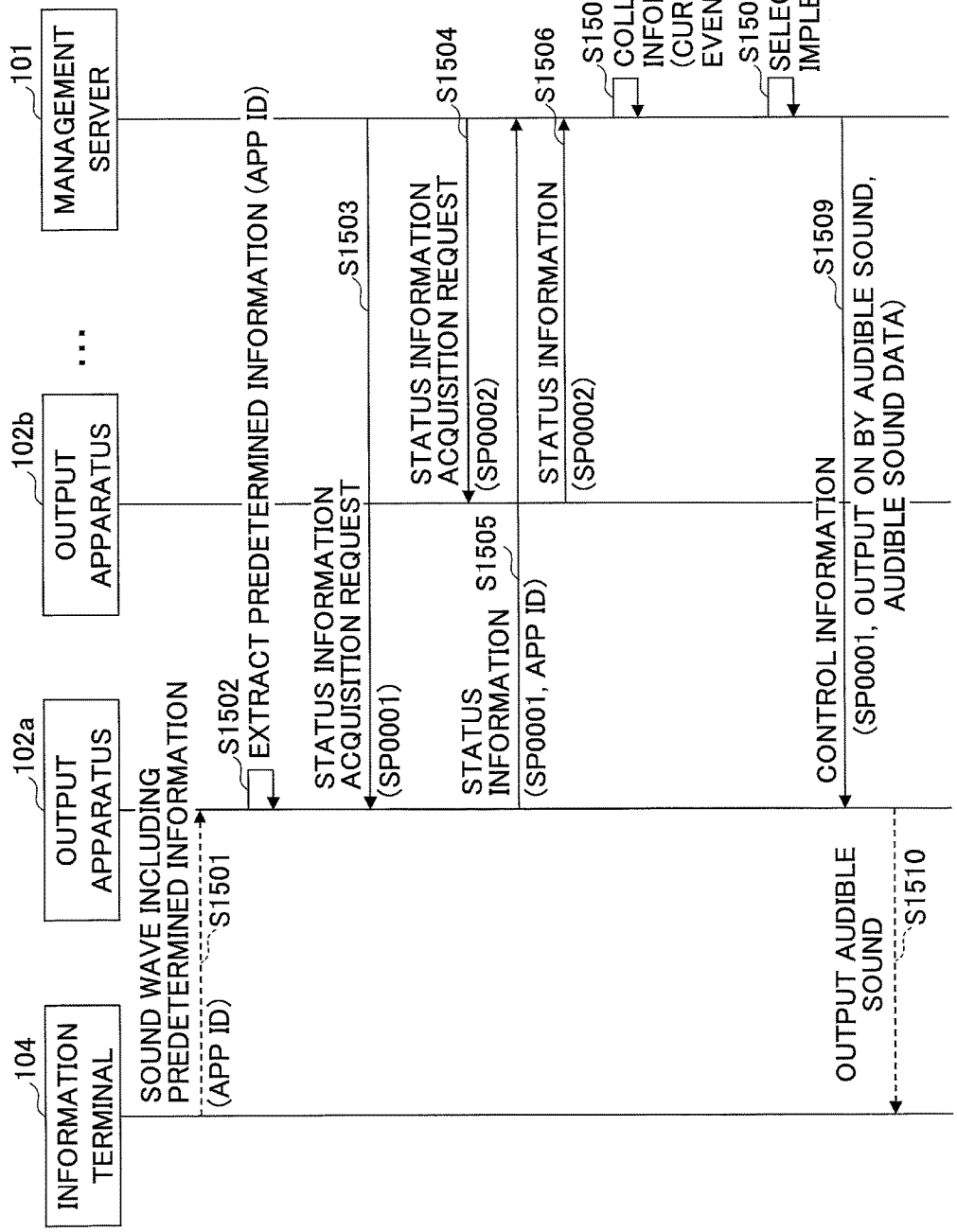

INFORMATION PROCESSING APPARATUS, INFORMATION PROCESSING SYSTEM, AND INFORMATION PROCESSING METHOD

CROSS-REFERENCE TO RELATED APPLICATION

The present application is based on and claims priority to Japanese Patent Application No. 2015-106766 filed on May 26, 2015, the entire contents of which are incorporated herein by reference.

BACKGROUND OF THE INVENTION

1. Field of the Invention

The present invention relates to an information processing apparatus, an information processing system, and an information processing method.

2. Description of the Related Art

Position information systems for providing position information and the like to a location, such as indoors or underground, where position cannot be accurately measured through satellite, are known.

SUMMARY OF THE INVENTION

According to one embodiment of the present invention, an information processing apparatus is provided that includes a processor coupled to a memory and configured to execute steps of storing corresponding information associating a predetermined event with apparatus information of an output apparatus, among the plurality of output apparatuses, that is installed at a predetermined position, and a control to be implemented with respect to the output apparatus; collecting event information relating to the predetermined event that is occurring; selecting the control to be implemented with respect to the output apparatus based on the collected event information; and instructing the output apparatus to implement the selected control.

BRIEF DESCRIPTION OF THE DRAWINGS

FIGS. 8A and 8B show examples of position information managed by a position information managing unit according to an embodiment of the present invention;

FIG. 11 shows an example of status information according to an embodiment of the present invention;

FIGS. 12A and 12B show examples of corresponding information managed by a corresponding information managing unit according to an embodiment of the present invention;

FIGS. 13A and 13B show further examples of the corresponding information managed by the corresponding information managing unit;

FIG. 14 is a flowchart showing a process operation implemented by the management server according to an embodiment of the present invention; and FIG. 15 is a sequence chart showing an example overall process operation of the information processing system according to an embodiment of the present invention.

DESCRIPTION OF EMBODIMENTS

According to one aspect of the present invention, an information processing apparatus is provided that can easily control an output apparatus in response to a predetermined event in an information processing system that includes a plurality of output apparatuses that output a predetermined signal.

In the following, embodiments of the present invention are described with reference to the accompanying drawings.

<System Configuration>

Figure 1:
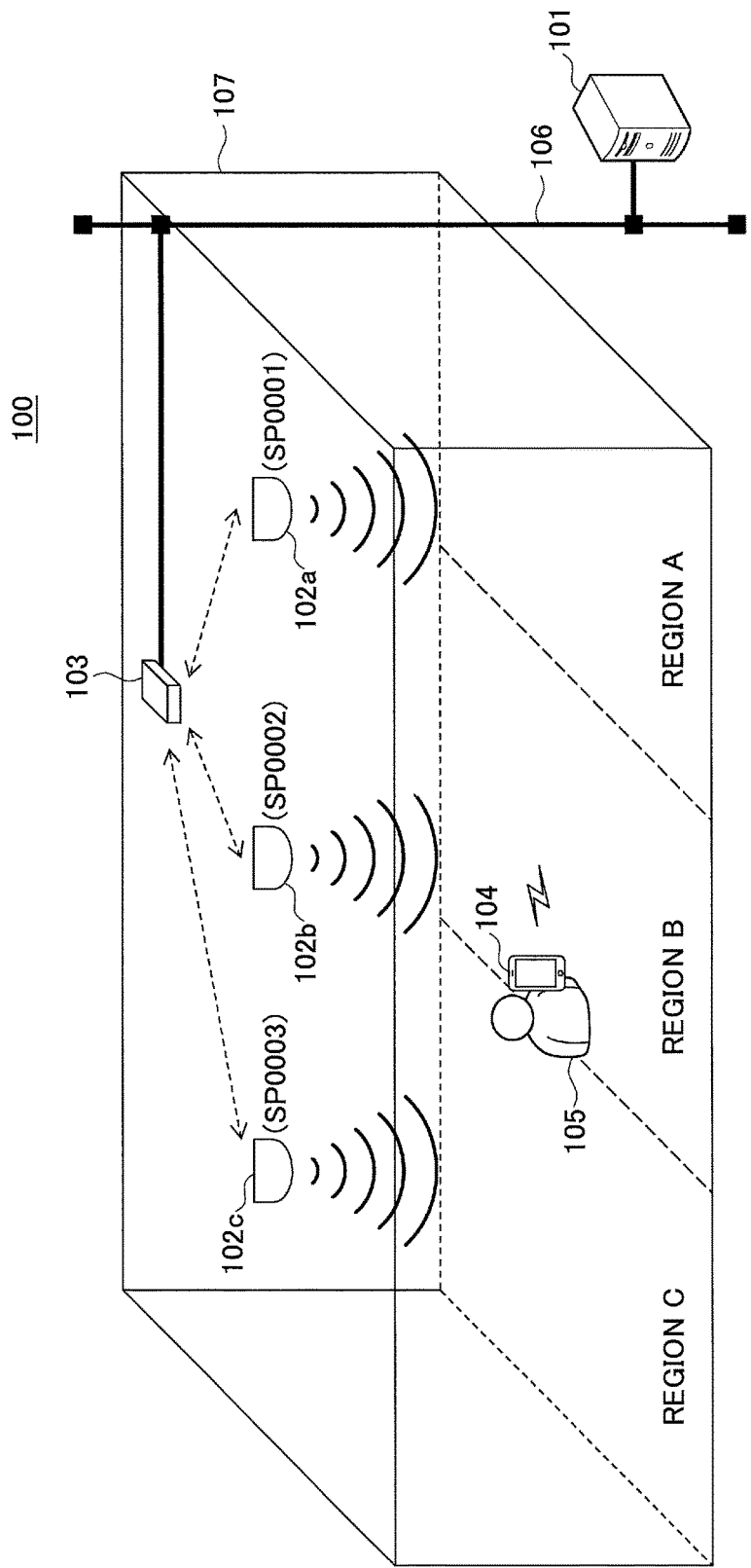
FIG. 1 is a diagram showing an example configuration of an information processing system according to an embodiment of the present invention.
Figure 2:
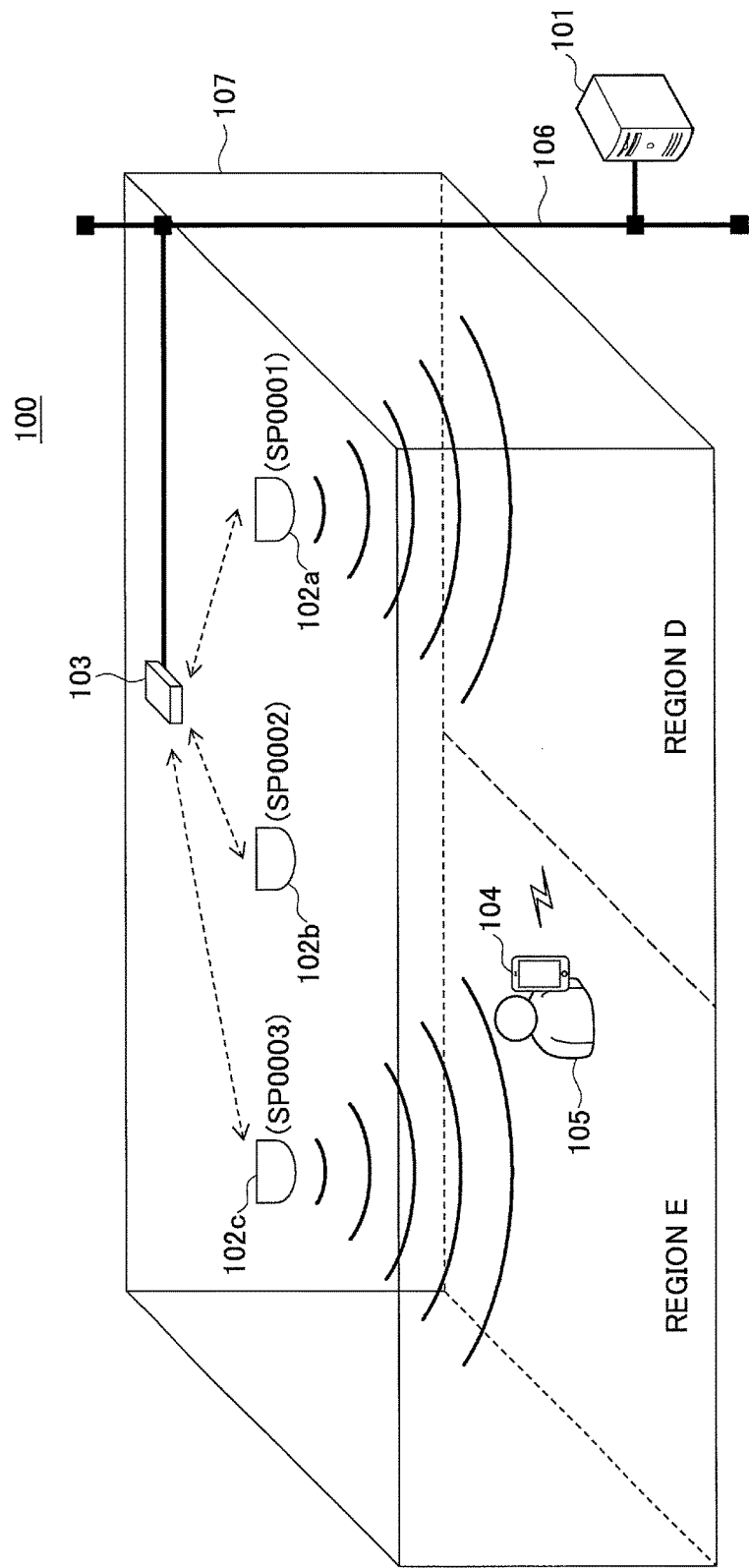
FIG. 2 is a diagram showing another example configuration of an information processing system according to an embodiment of the present invention.

FIGS. 1 and 2 show example configurations of an information processing system 100 according to embodiments of the present invention. In FIG. 1, the information processing system 100 includes a management server 101, a plurality of output apparatuses 102a-102c, a gateway 103, and an information terminal 104. Note that in the descriptions below, a given output apparatus among the plurality of output apparatuses 102a-102c may simply be referred to as "output apparatus 102". Also, note that the number the devices, such as the output apparatus 102, the gateway 103, and the information terminals 104, included in the information processing system 100 is not particularly limited, and FIG. 1 merely shows one example arrangement of such devices.

The plurality of output apparatuses 102a-102c may be installed at different positions on the ceiling of a building 107, for example. Each output apparatus 102 outputs a signal including apparatus information of the output apparatus 102, such as identification information of the output apparatus 102 or position information of the output apparatus 102.

In the example shown in FIG. 1, the output apparatus 102a outputs a sound wave, which includes an apparatus ID "SP0001" corresponding to identification information identifying the output apparatus 102a, toward region A. Similarly, the output apparatus 102b outputs a sound wave, which includes an apparatus ID "SP0002" corresponding to identification information identifying the output apparatus 102b, toward region B, and the output apparatus 102c outputs a sound wave, which includes an apparatus ID "SP0003" corresponding to identification information identifying the output apparatus 102c, toward region C.

Also, the output apparatuses 102 are connected to a wireless network that is provided by the gateway 103 so that the output apparatuses 102 may communicate with the management server 101 via the gateway 103. Note that each of the output apparatuses 102 may be configured to output an output apparatus ID designated by the management server 101, or a pre-set output apparatus ID stored in its own memory, for example.

The gateway 103 may be connected to the management server 101 via a network 106, such as the Internet or a LAN (local area network), for example. The gateway 103 forms a wireless network with the output apparatuses 102. The gateway 103 routes data to be exchanged between the management server 101 and the output apparatuses 102 that are connected to the wireless network provided by the gateway 103.

The information terminal 104 may be a terminal device, such as a smartphone, a mobile phone, or a tablet terminal, that is carried by a user 105, for example. The information terminal 104 is capable of establishing connection with the network 106 through wireless communication in order to communicate with the management server 101. Also, the information terminal 104 executes an application program (hereinafter referred to as "app") for enabling the information terminal 104 to implement the information processing system 100.

By executing the app for the information terminal 104, the information terminal 104 acquires a sound wave output by the output apparatus 102 using an internal microphone, for example, and extracts apparatus information of the output apparatus 102 (e.g., output apparatus ID of the output apparatus 102) that is included in the acquired sound wave. Also, the app for the information terminal 104 includes unique identification information (hereinafter referred to as "app ID") identifying each individual app installed in the information terminal 14. Once the information terminal 104 executes the app and extracts apparatus information of the output apparatus 102, the information terminal 104 transmits sender information including the extracted apparatus information of the output apparatus 102 and the app ID of the app that is run on the information terminal 104 to the management server 101.

Note that the app ID is an example of sender identification information that identifies the information terminal 104 sending the sender information, user identification information that identifies the user of the information terminal 104, and identification information of the app that is run on the information terminal 104. By using the app ID, the information processing system 100 may be able to identify the information terminal 104 without referring to personal information, such as a phone number of the information terminal 104 or an email address of the user, for example. Note, however, that the app ID is merely one example of identification information that may be used to identify an information terminal 104, a user, or an app, and in other examples, identification information of the information terminal 104 or identification information of the user 105 using the information terminal 104 may be used.

The management server 101 may be an information processing apparatus, such as a PC (Personal Computer) that is connected to the network 106. The management server 101 executes an app that enables the management server 101 to implement the information processing system 100. The management server 101 manages position information including information on the location of each of the output apparatuses 102 and is capable of identifying the position of the information terminal 104 based on the sender information acquired from the information terminal 104. For example, in FIG. 1, the management server 101 may be able to determine that the information terminal 104 of the user 105 is located within region B based on the sender information acquired from the information terminal and the position information of the output apparatuses 102 managed at the management server 101.

In the following descriptions, it is assumed, for example, that the floor layout of the building 107 is changed from being divided into three regions (regions A, B, and C) as shown in FIG. 1 to being divided into two regions (regions D and E) as shown in FIG. 2. In this case, if each of the output apparatuses 102a-102c is configured to output a sound wave including its corresponding apparatus information as shown in FIG. 1, it may be difficult to determine whether the information terminal 104 of the user 105 is located in region D or region E.

In this respect, for example, the management server 101 according to the present embodiment may implement a predetermined control with respect to one or more of the output apparatuses 102 in response to such a change in the floor layout (corresponding to an example of a predetermined event).

Note that in the example described below, the floor layout as shown in FIG. 1 including regions A, B, and C is referred to as "first layout", and the floor layout as shown in FIG. 2 including regions D and E is referred to as "second layout" below.

In the present example, in response to the change in the floor layout from the first layout to the second layout, the management server 101 may control the output apparatus 102b to stop outputting a signal (sound wave) as shown in FIG. 2, for example. Also, the management server 101 may adjust a signal detection range, within which a signal output by the output apparatus 102a can be detected (e.g., by increasing/decreasing the output intensity level or changing the output direction of the signal), such that the signal output by the output apparatus 102a covers region D, for example. Similarly, the management server 101 may adjust a signal detection range, within which a signal output by the output apparatus 102c can be detected, such that the signal output by the output apparatus 102c covers region C, for example.

In this way, the management server 101 may be able to determine that the information terminal 104 of the user 105 is located within region E.

Note that a change in the floor layout is merely one example of a predetermined event. Also, adjusting the detection range of the signal output by the output apparatus 102 is merely one example of a control implemented with respect to the output apparatus 102.

As described above, the management server 101 according to the present embodiment is capable of controlling one or more output apparatuses 102 in response to a predetermined event in the information processing system 100 including a plurality of output apparatuses 102 that output a predetermined signal.

<Hardware Configuration>

In the following, hardware configurations of the individual devices included in the information processing system 100 are described.

(Hardware Configuration of Management Server)

Figure 3:
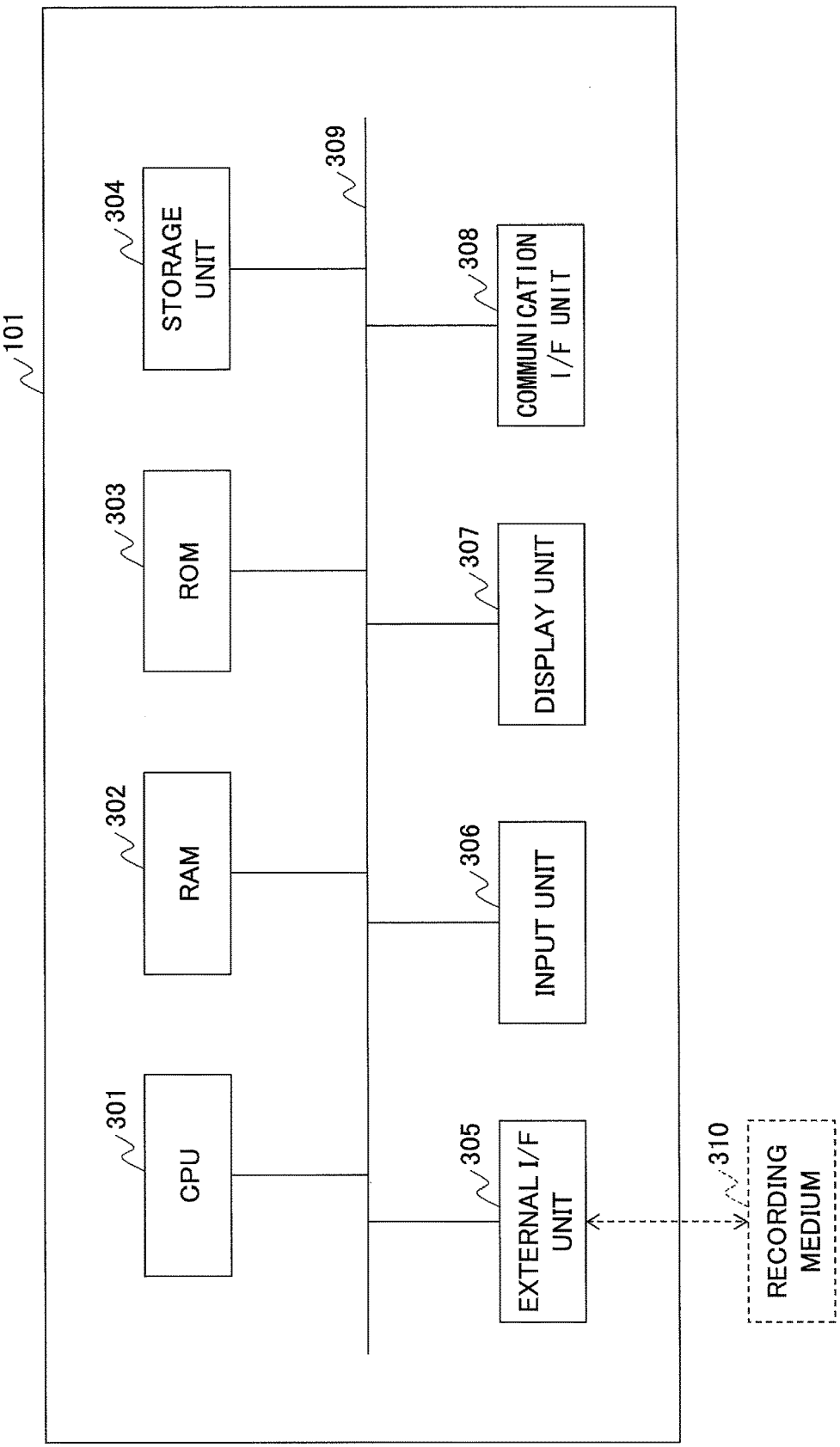
FIG. 3 is a block diagram showing an example hardware configuration of a management server according to an embodiment of the present invention.

FIG. 3 is a block diagram showing an example hardware configuration of the management server 101 according to an embodiment of the present invention. In FIG. 3, the management server 101 has a configuration of a general-purpose computer including a CPU (Central Processing Unit) 301, a RAM (Random Access Memory) 302, a ROM (Read Only Memory) 303, a storage unit 304, an external I/F (Interface) unit 305, an input unit 306, a display unit 307, a communication I/F unit 308, and a bus 309.

The CPU 301 includes an arithmetic and logic unit that reads a program and/or data from a storage device such as the ROM 303 and/or the storage unit 304, loads the program and/or data in the RAM 302, and executes processes according to the program and/or data to control the overall operations and functions of the management server 101. The RAM 302 is a volatile memory (storage device) that is used as a working area of the CPU 301. The ROM 303 is a nonvolatile memory (storage device) that can retain programs and/or data even when the power is turned off.

The storage unit 304 may be a storage device, such as an HDD (Hard Disk Drive) or an SSD (Solid State Drive), that stores an OS (Operating System), application programs, and various types of data, for example.

The external I/F unit 305 is an interface with an external device. The external device may be a recording medium 310, for example. The management server 101 may read information from and/or write information on the recording medium 201 via the external I/F unit 305. Specific examples of the recording medium 310 include an optical disk, a magnetic disk, a memory card, a universal serial bus (USB) memory, and the like. Also, a predetermined program may be stored in the recording medium 310, and the predetermined program may be installed in the management server 101 via the external I/F unit 305 to be executed by the management server 101, for example.

The input unit 306 may include a keyboard and/or a mouse, for example, and is used to input various operation signals to the management server 101. The display unit 307 may include a display, for example, and is configured to display processing results of the management server 101.

The communication I/F unit 308 is a communication interface such as a wired/wireless LAN that connects the management server 101 to the network 106. In this way, the management server 101 may establish data communication with other computers via the communication I/F unit 308. The bus 309 is connected to the above-described elements of the management server 101 and transmits signals, such as an address signal, a data signal, and various control signals.

(Hardware Configuration of Output Apparatus)

Figure 4:
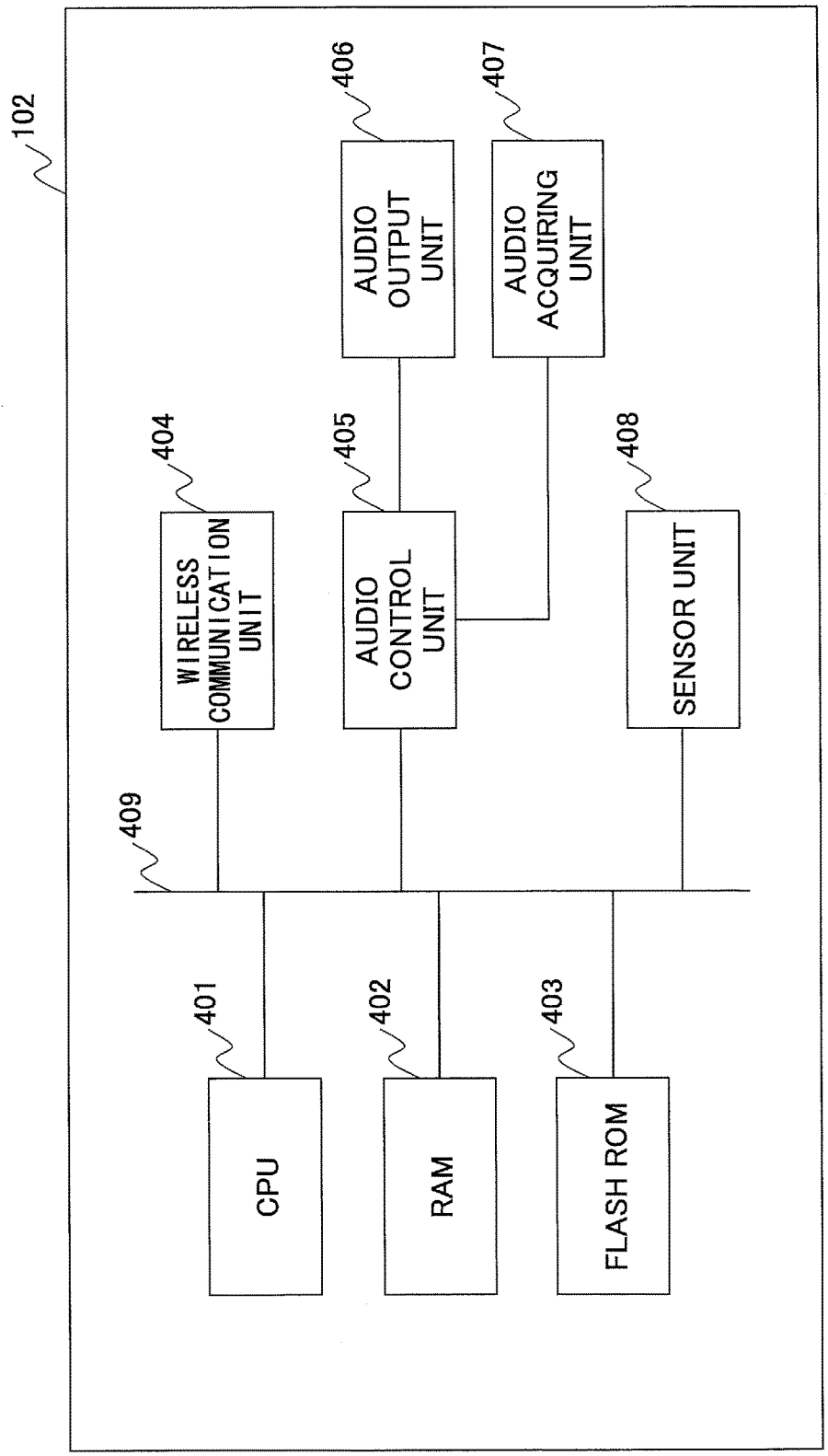
FIG. 4 is a block diagram showing an example hardware configuration of an output apparatus according to an embodiment of the present invention.

FIG. 4 is a block diagram showing an example hardware configuration of the output apparatus 102 according to an embodiment of the present invention. In FIG. 4, the output apparatus 102 includes a CPU 401, a RAM 402, a flash ROM 403, a wireless communication unit 404, an audio control unit 405, an audio output unit 406, an audio acquiring unit 407, a sensor unit 408, and a bus 409.

The CPU 401 is an arithmetic unit that implements various functions of the output apparatus 102 by executing a relevant program stored in the flash ROM 403, for example. The RAM 402 is a volatile memory used as a working area for the CPU 401. The flash ROM 403 is a nonvolatile memory for storing programs of the output apparatus 102 and unique information, such as the output apparatus ID of the output apparatus 102.

The wireless communication unit 404 may include a transceiver circuit and an antenna for establishing wireless communication with the gateway 103, for example. The wireless communication unit 404 may establish wireless communication with the gateway 103 using, for example, a wireless LAN, Zigbee (registered trademark), a 920 MHz band specified low-power wireless module (IEEE 802.15.4g), or the like.

The audio control unit 405 converts information, such as the output apparatus ID of the output apparatus 102 that is stored in the flash ROM 603, into a sound wave signal, and outputs the sound wave signal to the audio output unit 406.

In a preferred embodiment, the audio control unit 405 converts information such as the output apparatus ID into a sound wave signal having a high frequency of at least 16 kHz of the audio frequency band, for example. Note that the directivity of a sound wave increases as the frequency of the sound wave increases, and at a frequency of 16 kHz or higher, the sound wave would be hardly audible to the human ear. Thus, a sound wave at such a high frequency may be suitable for transmitting information such as the output apparatus ID of the output apparatus 102.

The audio control unit 405 also extracts information included in a sound wave acquired by the audio acquiring unit 407. Further, the audio control unit 405 controls the audio output unit 406 to adjust the output intensity level of the sound wave output by the audio output unit 406, for example.

Note that the present embodiment is not limited to using a particular data transmission method to transmit a sound wave. For example, a known modulation scheme, such as FSK (Frequency Shift Keying) or PSK (Phase Shift Keying), may be applied to a sound wave of a predetermined frequency to transmit information.

The audio output unit 406 includes an electroacoustic transducer, such as a speaker, that converts a sound wave signal input from the audio control unit 405 into a sound wave and outputs the sound wave.

The audio acquiring unit 407 includes an electroacoustic transducer, such as a microphone, and is configured to convert a sound wave acquired by the microphone into a sound wave signal and output the sound wave signal to the audio control unit 405.

The sensor unit 408 is a detection device that detects a state of the environment surrounding the output apparatus 102. For example, the sensor unit 408 may include a moving object sensor, a temperature sensor, an image sensor, and the like.

The bus 409 is connected to the above-described elements of the output apparatus 102 and transmits signals, such as an address signal, a data signal, and various control signals.

(Hardware Configuration of Gateway)

Figure 5:
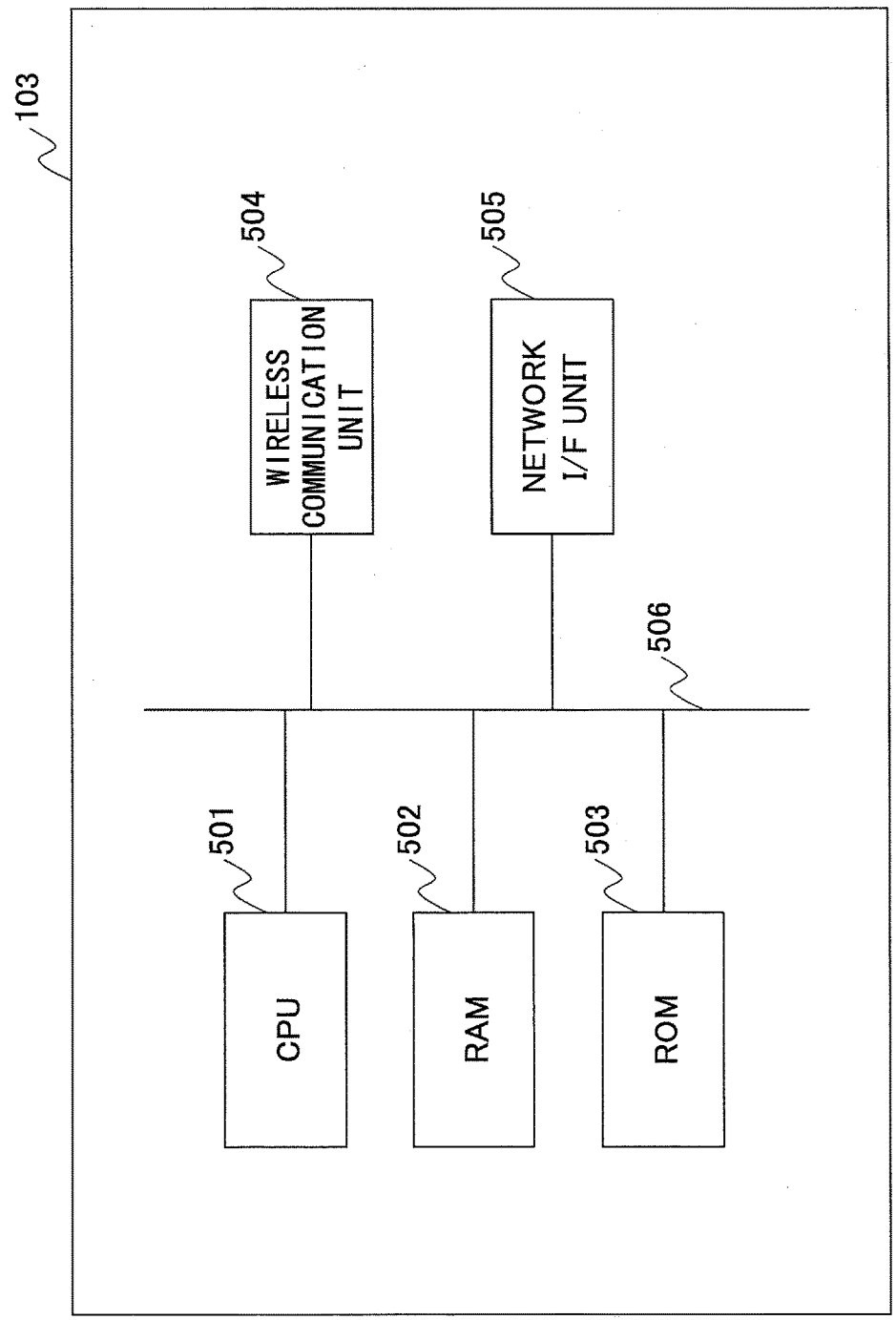
FIG. 5 is a block diagram showing an example hardware configuration of a gateway according to an embodiment of the present invention.

FIG. 5 is a block diagram showing an example hardware configuration of the gateway 103 according to an embodiment of the present invention. In FIG. 5, the gateway 103 includes a CPU 501, a RAM 502, a ROM 503, a wireless communication unit 504, a network I/F unit 505, and a bus 506.

The CPU 501 is an arithmetic unit that executes a program stored in the ROM 503 or the like to implement various functions of the gateway 103. The RAM 502 is a volatile memory used as a working area for the CPU 501. The ROM 503 is a nonvolatile memory that stores a program of the gateway 103 and the like. The ROM 503 may be a rewritable nonvolatile memory, such as a flash ROM or an EEPROM, for example.

The wireless communication unit 504 may include, for example, a wireless circuit and an antenna for establishing wireless communication using the same wireless communication scheme as the wireless communication unit 404 of the output apparatus 102 as described above.

The network I/F unit 505 is a communication interface for connecting the gateway 103 to the network 106.

The bus 506 is connected to the above-described elements of the gateway 103 and transmits signals, such as an address signal, a data signal, and various control signals.

(Hardware Configuration of Information Terminal)

Figure 6:
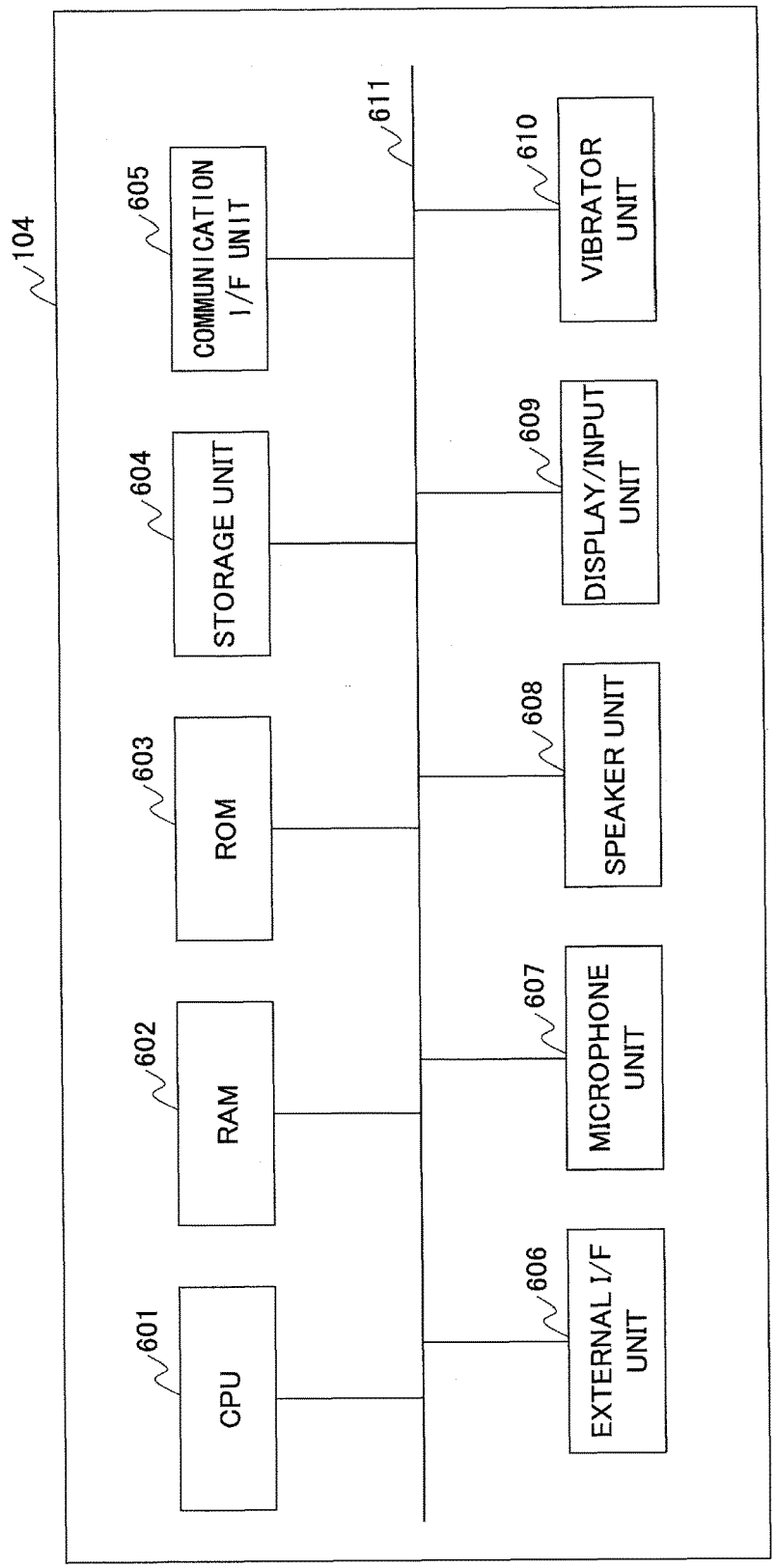
FIG. 6 is a block diagram showing an example hardware configuration of an information terminal according to an embodiment of the present invention.

FIG. 6 is a block diagram showing an example hardware configuration of the information terminal 104 according to an embodiment of the present invention. The information terminal 104 has a configuration of a general-purpose computer including a CPU 601, a RAM 602, a ROM 603, a storage unit 604, a communication I/F unit 605, an external I/F unit 606, a microphone unit 607, a speaker unit 608, a display/input unit 609, a vibrator unit 610, and a bus 611.

The CPU 601 is an arithmetic unit that loads a program and/or data stored in the ROM 603, the storage unit 604, or the like into the RAM 602, and executes processes to implement various functions of the information terminal 104. The RAM 602 is a volatile memory used as a working area for the CPU 601. The ROM 603 is a nonvolatile memory that is capable of retaining programs and/or data even when the power is turned off.

The storage unit 604 may be a storage device, such as a HDD, a SSD, or a flash ROM, and stores an OS, application programs, and various types of data.

The communication I/F unit 605 is a communication interface that establishes communication using a mobile communication network, such as 3G (Third Generation) or LTE (Long Term Evolution), or a wireless LAN, for example. The information terminal 104 establishes connection with the network 106 via the communication I/F unit 605 to communicate and exchange data with the management server 101 and the like.

The external I/F unit 606 is an interface with an external device. The external device may include a recording medium, for example. The information terminal 104 may read and/or write data from/on the recording medium via the external I/F unit 606, for example. The recording medium may be a memory card, a USB memory, or the like.

The microphone unit 607 includes an audio pickup device such as a microphone. The microphone unit 607 converts a sound wave acquired by the microphone into an electric signal and further converts the signal into sound wave data in a predetermined format. Note that microphones included in smartphones of recent years have the capability to pick up sound waves of up to 20 kHz, or even 24 kHz in more preferred examples. Thus, if the microphone unit 607 includes such a microphone, it may be able to acquire information that is converted into a high frequency signal of 16 kHz or higher that is included in the sound wave output from the output apparatus 102, for example.

The speaker unit 608 includes an audio output device such as a speaker. The speaker unit 608 converts audio data into an audio signal, and further converts the audio signal into a sound wave to be output by the speaker, for example.

The display/input unit 609 may include a display device such as a LCD (Liquid Crystal Display) and an input device such as a touch panel, for example. The display/input unit 609 accepts a user input operation by a user and displays a display screen generated by a program executed by the information terminal 104, for example.

The vibrator unit 610 may be a vibration generating unit for notifying a user of an event, such as an incoming call, an alarm, or the reception of information, through vibration. The bus 611 is connected to the above-described elements of the information terminal 104 and transmits signals, such as an address signal, a data signal, and various control signals.

Note that the information terminal 104 may install an app that is stored in a recording medium connected to the external I/F unit 606 or downloaded via the communication I/F unit 605 and execute the installed app. For example, the information terminal 104 may download the app for implementing the information processing system 100 from the management server 101 and execute the downloaded app.

<Functional Configuration>

In the following, an example functional configuration of the information processing system 100 is described.

Figure 7:
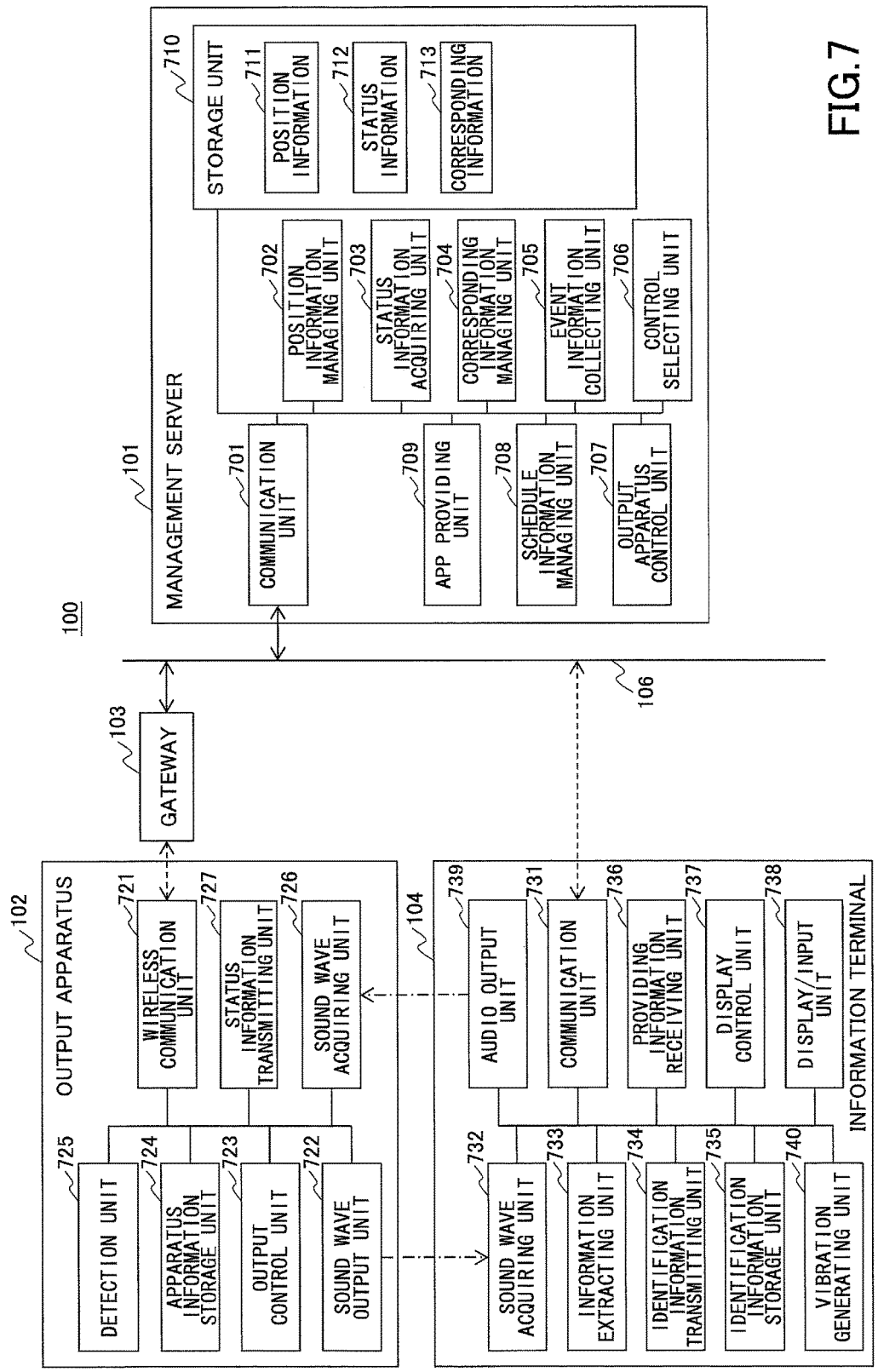
FIG. 7 is a block diagram showing an example functional configuration of the information processing system according to an embodiment of the present invention.

FIG. 7 is a block diagram showing an example functional configuration of the information processing system 100 according to an embodiment of the present invention. In FIG. 7, the information processing system 100 includes the management server 101, the output apparatus 102, the gateway 103, and the information terminal 104.

(Functional Configuration of Management Server)

The management server (information processing apparatus) 101 includes a communication unit 701, a position information managing unit 702, a status information acquiring unit 703, a corresponding information managing unit 704, an event information collecting unit 705, a control selecting unit 706, an output apparatus control unit 707, a schedule information managing unit 708, an app providing unit 709, and a storage unit 710.

The communication unit 701 connects the management server 101 to the network 106, and establishes communication with the gateway 103, the information terminal 104, and the like. The communication unit 701 may be implemented by the communication I/F unit 308 and a program executed by the CPU 301 of FIG. 3, for example.

The position information managing unit 702 acquires sender information including sender identification information (information identifying the user, the app, or the information terminal 104 sending the sender information) and the apparatus information of the output apparatus 102 acquired by the information terminal 104 corresponding to the sender of the sender information via the communication unit 701, and manages the acquired information. The apparatus information of the output apparatus 102 acquired by the sender may include, for example, the output apparatus ID corresponding to identification information of the output apparatus 102 and/or information indicating the installation location (position) of the output apparatus 102. In the following descriptions, it is assumed that the apparatus information of the output apparatus 102 includes the output apparatus ID of the output apparatus 102.

The position information managing unit 702 also manages position information 711 stored in the storage unit 710. For example, the position information managing unit 702 manages position information of one or more information terminals 104 based on sender information acquired from the one or more information terminals 104. The position information managing unit 702 may be implemented by a program executed by the CPU 301 of FIG. 3, for example.

FIGS. 8A and 8B show examples of position information managed by the position information managing unit 702 according to an embodiment of the present invention.

FIG. 8A shows an example of output apparatus position information storing the output apparatus IDs of a plurality of output apparatuses 102 in association with information indicating their corresponding installation locations (positions). Based on such output apparatus position information, the position information managing unit 702 may be able to determine the position of the output apparatuses 102 based on the output apparatus IDs of the output apparatuses 102.

FIG. 8B shows an example of information terminal position information that is managed based on the sender information acquired by the position information managing unit 702 from one or more information terminals 104. Note that in FIG. 8B, "sender ID (app ID)" corresponds to the sender identification information (e.g. app ID) included in the sender information acquired by the position information managing unit 702. "Output apparatus ID" corresponds to the output apparatus ID of the output apparatus 102 included in the acquired sender information. "Position" is information indicating the position of the output apparatus 102 identified based on the output apparatus ID and the position of the information terminal 104. The position of the output apparatus 102 and the information terminal 104 may be determined based on the output apparatus position information shown in FIG. 8A and the output apparatus ID included in the sender information acquired from the information terminal 104. "Acquisition date/time" may be information indicating the date/time the position information managing unit 702 acquired the sender information, for example.

The position information managing unit 702 also manages floor layout information representing the floor layout of the building 107 in which the output apparatuses 102 are installed, for example.

Figure 9:
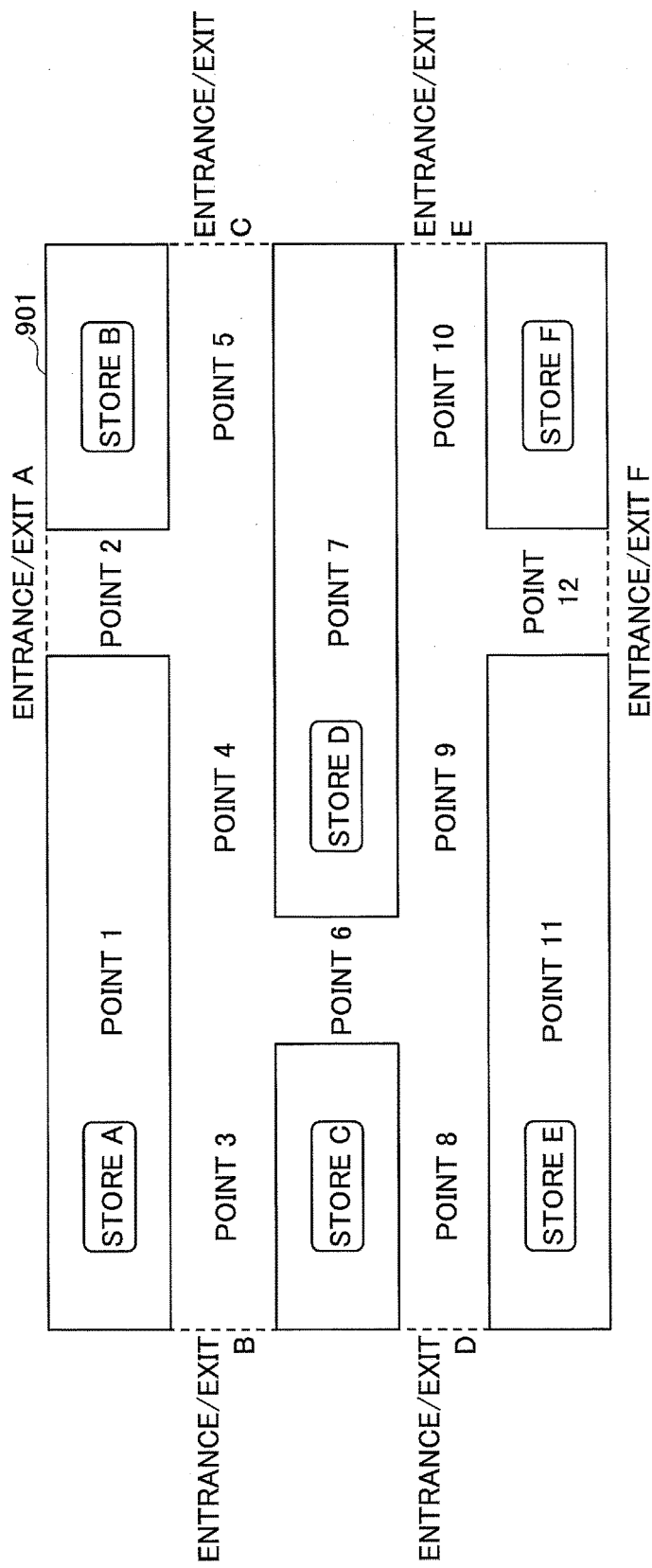
FIG. 9 shows an example of floor layout information according to an embodiment of the present invention.

FIG. 9 shows an example of floor layout information representing a floor layout 901 of the building 107. In FIG. 9, the floor layout information indicates the locations of stores (stores A-F) and the installation locations of the output apparatuses 102 (points 1-10). In the example of FIG. 9, it is assumed that the stores are where goods are placed, and customers move along passageways arranged between the stores. Note that in the case of acquiring position information of an information terminal 104 carried by a user moving along the passageways in the example of FIG. 9, the output apparatuses 102 located at points 1, 7, and 11 (located at stores A, D, and E) do not necessarily have to output their corresponding output apparatus IDs.

Figure 10:
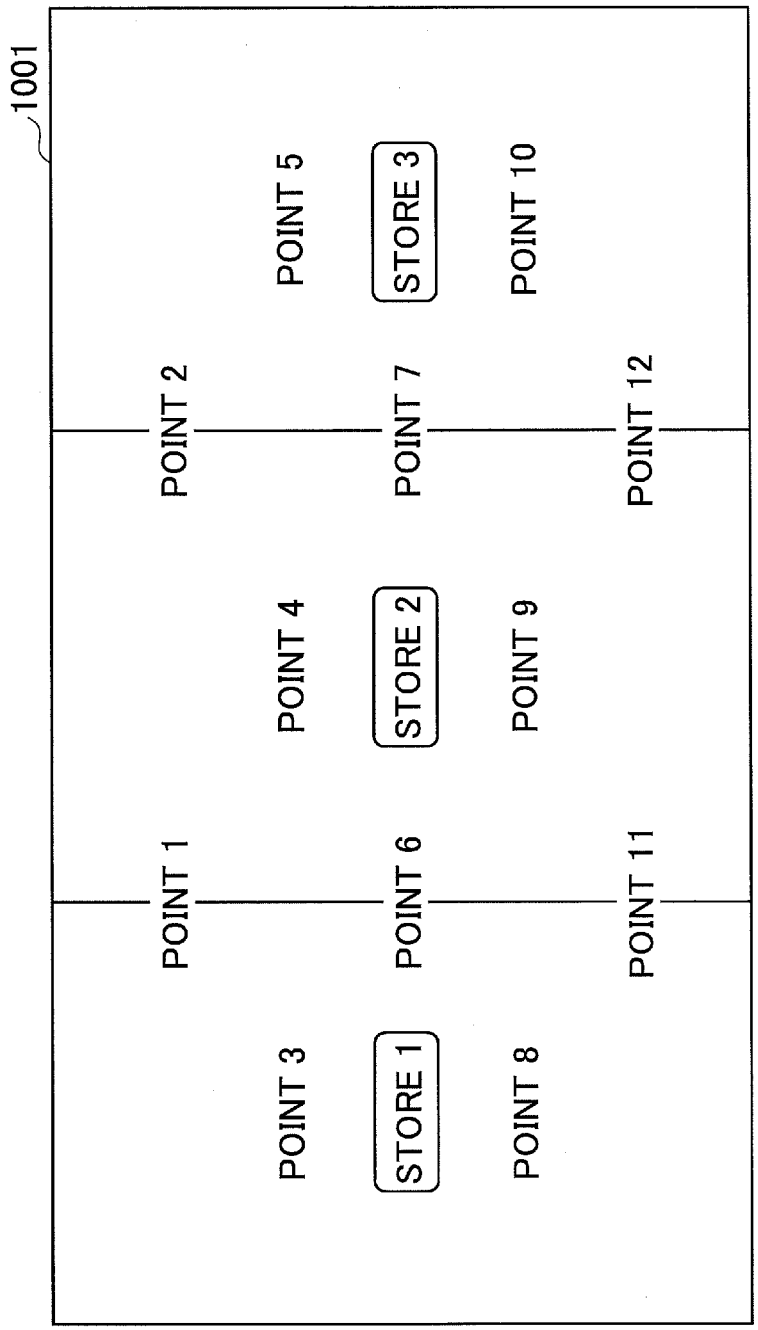
FIG. 10 shows another example of floor layout information according to an embodiment of the present invention.

FIG. 10 shows another example of floor layout information representing a floor layout 1001 according to an embodiment of the present invention. The floor layout information of FIG. 10 represents a layout of stores similar to that shown in FIG. 9. However, in the example of FIG. 10, the floor is divided into three stores (stores 1-3). As described above, the position information managing unit 702 preferably manages multiple sets of floor layout information representing different floor layouts. Note that in the case of determining to position of an information terminal 104 in the example of FIG. 10, the output apparatuses 102 located along the boundaries of the stores 1-3 (i.e., output apparatuses 102 located at points 1, 5, 11, 2, 7, and 12) are preferably controlled to refrain from outputting their corresponding output apparatus IDs. That is, for example, when an information terminal 104 acquires and sends sender information including the apparatus ID "SP001" of the output apparatus 102 located at point 1, the position information management unit 702 may not be able to determine whether the information terminal 104 is located at store 1 or store 2.

Based on the position information as described above, the position information managing unit 702 may be able to determine and manage the position of each information terminal 104. For example, the position information managing unit 702 can determine, based on the information terminal position information shown in FIG. 8B, that the information terminal 104 that runs an app with the app ID "AP0002" is located at point 3. Also, the position information managing unit 702 can determine, based on the floor layout information shown in FIG. 9, that the information terminal 104 that is running the app with the app ID "AP0001" is located between store A and store C. Also, the position information managing unit 702 can determine, based on the floor layout information shown in FIG. 10, that the information terminal 104 that is running the app with the app ID "AP0001" is located at store 1.

Referring back to FIG. 7, the other functional elements of the management server 101 are described.

The status information acquiring unit 703 acquires, from an output apparatus 102, status information including apparatus information (output apparatus ID and/or position information) of the output apparatus 102 and information indicating a status of the output apparatus 102. The status information acquiring unit 703 also stores the acquired status information as status information 712 in the storage unit 710, for example. The status information acquiring unit 703 may be implemented by a program executed by the CPU 301 of FIG. 3, for example.

FIG. 11 shows an example of the status information 712 managed by the status information acquiring unit 703 according to an embodiment of the present invention.

In the example shown in FIG. 11, the status information 712 includes information items, such as "output apparatus ID", "position", "ambient sound level", "detection of moving object within predetermined time period", and "detection of predetermined information".

Note that the "output apparatus ID" of the status information 712 corresponds to the "output apparatus ID" of the position information shown in FIGS. 8A and 8B. Also, the "position" of the status information 712 indicates that installation location of the output apparatus 102 and corresponds to the "position" of the position information shown in FIGS. 8A and 8B. The "output apparatus ID" and the "position" are examples of apparatus information of the output apparatus 102.

The "ambient sound level" is an example of information indicating a status of the output apparatus 102. In the present example, the "ambient sound volume level" indicates the ambient sound volume at the output apparatus 102 on a scale of 1 to 10, where "10" represents the highest volume.

The "detection of moving object within predetermined time period" is another example of information indicating a status of the output apparatus 102. In the present example, the "detection of moving object within predetermined time period" indicates whether a moving object sensor or the like that detects a moving object near the output apparatus 102 has detected a moving object (e.g., a person) within a predetermined time period (e.g., one minute).

The "detection of predetermined information" is another example of information indicating a status of the output apparatus 102. In the present example, when installing an app in the information terminal 104 for implementing the information processing system 100 and registering to use the app, the user of the information terminal 104 may register user information, for example. At such time, the user may register information indicating that the user is visually impaired or information indicating some other relevant user information, for example, and in this way, the information terminal 104 may be set up to output a sound wave including predetermined information (e.g., app ID). When the audio acquiring unit 407 of the output apparatus 102 detects a sound wave including such predetermined information, the detected predetermined information may be indicated as the "detection of predetermined information" in the status information 712. In the example of FIG. 11, the app ID "AP0006" is detected as predetermined information at point 5, and based on such information, it may be determined that a visually impaired person is located at point 5, for example.

Note that the status information 712 shown in FIG. 11 is merely one example, and the status information of the output apparatus 102 may include other various types of information acquired from the output apparatus 102, for example.

Referring back to FIG. 7, the other functional elements of the management server 101 are described.

The corresponding information managing unit 704 stores and manages corresponding information 713 in the storage unit 710. The corresponding information 713 associates a predetermined event with information relating to the position of each output apparatus 102 and control to be implemented with respect to each output apparatus 102. The corresponding information managing unit 704 may be implemented by a program executed by the CPU 301 of FIG. 3, for example.

FIGS. 12A-13B show examples of the corresponding information 713 managed by the corresponding information managing unit 704 according to an embodiment of the present invention.

FIG. 12A is a table showing an example of the corresponding information 713 to be used when a layout change occurs as a predetermined event. The corresponding information 713, shown in FIG. 12A, stores information items, such as "output apparatus ID", "position", and "control" in association with an "event".

Note that in the present example, it is assumed that the corresponding information 713 such as those shown in FIGS. 12A-13B is set up in advance by an administrator of the server manager 101, for example. For example, the corresponding information managing unit 704 may cause a web browser of a PC or an information terminal 104 used by the administrator to display a registration web page to prompt the administrator to register the corresponding information 713 and store the corresponding information 713 registered via the registration web page in the storage unit 710. Alternatively, the corresponding information managing unit 704 may receive the corresponding information 713 that has been registered via an app run on the PC or the information terminal 104 of the administrator and store the received corresponding information 713 in the storage unit 710, for example.

Note that the "event" of the corresponding information 713 is information indicating a predetermined event. Also, it is assumed that "layout A" of FIG. 12A corresponds to the floor layout shown in FIG. 9, and "layout B" of FIG. 12A corresponds to the floor layout shown in FIG. 10. The "layout A" and "layout B" are examples of predetermined events according to an embodiment of the present invention.

The event "layout A" may occur when a notification is issued from the information terminal 104 of a facility manager or the like indicating that the floor layout has been changed to "layout A", or when the floor layout is changed to "layout A" according to a pre-set schedule set up and managed by the schedule information managing unit 708, for example.

The "output apparatus ID" of the corresponding information 713 corresponds to the "output apparatus ID" of the position information shown in FIGS. 8A and 8B. The "position" of the corresponding information 713 indicates the installation location of the output apparatus 102 and corresponds to the "position" of the position information shown in FIGS. 8A and 8B. The "output apparatus ID" and the "position" are examples of apparatus information of the output apparatus 102.

The "control" of the corresponding information 713 is information indicating the control to be implemented with respect to each output apparatus 102 when the corresponding "event" occurs.

For example, according to the corresponding information 713 shown in FIG. 12A, when the event "layout A" occurs, the management server 101 turns off the outputs of the output apparatuses 102 located at point 1, point 7, and point 11. Further, the management server 101 turns on the outputs of the other output apparatuses 102 located at the other points and sets their output intensity levels to "normal". In this way, the output apparatuses 102 may be set up to enable determination of the position of the information terminal 104 of the user 105 in a passageway of the floor layout shown in FIG. 9.

As another example, when the event "layout B" occurs, the management server 101 turns off the outputs of the output apparatuses 102 located at point 1, point 2, point 6, point 7, point 11, and point 12. Further, the management server 101 turns on the outputs of the other output apparatuses 102 located at the other points and sets their output intensity levels to "+3 dB", which is 3 dB higher than "normal". In this way, the management server 101 may implement suitable controls with respect to the output apparatuses 102 in response to the change in the floor layout to enable accurate determination of the position of the information terminal 104 of the user 105 that may be located in store 1, store 2, or store 3 of the floor layout shown in FIG. 10. Note that the specific events and controls described above are merely illustrative examples.

FIG. 12B is a table showing an example of the corresponding information 713 to be used when a pre-set schedule occurs as a predetermined event.

According to the corresponding information 713 shown in FIG. 12B, when the event "opening hour" occurs, the management server 101 turns on the output of each output apparatus 102 located at each point and sets the output intensity level of each output apparatus 102 to "normal". When the event "closing hour" occurs, the management server 101 turns off the output of every other output apparatus 102 such that the information processing system 100 may operate under power saving mode. Further, when the event "late evening" occurs, the management server 101 turns off the output of each output apparatus 102 located at each point. Note that the specific events and controls described above are merely illustrative examples.

FIG. 13A is a table showing an example of the corresponding information 713 to be used when the status information acquiring unit 703 acquires status information indicating a specific status or a specific combination of statuses of the output apparatus 102.

According to the corresponding information 713 shown in FIG. 13A, for example, when an event "ambient sound level high (point X)" (X=1, 2, 3, . . . ) occurs, the management server 101 controls the output intensity level of the output apparatus 102 located at point X to "+6 dB", which is 6 dB higher than "normal". Note that the event "ambient sound level high (point X)" may occur when the value of the "ambient sound level" of the status information shown in FIG. 11 is greater than or equal to a predetermined value (e.g., 6), for example. In the example of FIG. 11, the event "ambient sound level high (point X)" is occurring at the output apparatuses 102 located at points 7 and 5. Thus, by controlling the output intensity levels of these output apparatuses 102 to be higher than normal, the sound waves output by these output apparatuses 102 may be prevented from being canceled out by ambient sounds.

Also, according to the example of FIG. 13A, when an event "ambient sound level low (point X)" (X=1, 2, 3, . . . ) occurs, the management server 101 controls the output intensity level of the output apparatus 102 located at point X to "normal". Note that the event "ambient sound level low (point X)" may occur when the value of the "ambient sound level" of the status information shown in FIG. 11 is below a predetermined value (e.g., 5), for example. In the example of FIG. 11, the event "ambient sound level low (point X)" is occurring at the output apparatuses 102 located at points 3, 4, 6, 8, 9, 10, and 12.

Also, according to the example of FIG. 13A, when an event "no detection of moving object for predetermined time period" occurs, the management server 101 turns off the output of the output apparatuses 102 located at the even-numbered points to switch the operation mode of the information processing system 100 to power saving mode. Note that the event "no detection of moving object for predetermined time period" may occur when the status information item "detection of moving object within predetermined time period" in FIG. 11 does not include "YES" for any of the output apparatuses 102, for example.

Further, according to the example of FIG. 13A, when an event "detection of moving object" occurs, the management server 101 turns on the output of the output apparatuses 102 located at the even-numbered points to switch the operation mode of the information processing system 100 to normal mode. Note that the event "detection of moving object" may occur when the status information item "detection of moving object within predetermined time period" in FIG. 11 includes "YES" for at least one of the output apparatuses 102, for example.

FIG. 13B is a table showing another example of the corresponding information 713 to be used when the status information acquiring unit 703 acquires status information indicating a specific status or a combination of statuses of the output apparatus 102 as a predetermined event.

According to the corresponding information 713 shown in FIG. 13B, when an event "detection of predetermined information (point X)" (X=1, 2, 3, . . . ) occurs, the management server 101 controls the output apparatus 102 located at point X to output providing information by audible sound. Note that the event "detection of predetermined information (point X)" may occur when the status information item "detection of predetermined information" of FIG. 11 includes a value indicating predetermined information (e.g., app ID of an information terminal 104 of a visually impaired person), for example.

Note that the above-described corresponding information 713 of FIGS. 12A-13B are merely illustrative examples. Also, note that although the corresponding information 713 shown in FIGS. 12A-13B are described as separate sets of corresponding information, in some embodiments, the corresponding information may be integrally stored and managed, for example.

Referring back to FIG. 7, the other functional elements of the management server 101 are described.

The event information collecting unit 705 collects event information of a predetermined event that is occurring. The event information collecting unit 705 may be implemented by a program executed by the CPU 301 of FIG. 3, for example. Note that the predetermined event may correspond to one of the predetermined events registered in the "event" of the corresponding information 713 shown in FIGS. 12A-13B, for example. The event information collecting unit 705 collects event information relating to the predetermined event that is currently occurring.

The event information collecting unit 705 may collect event information by acquiring the status information 712 stored in the storage unit 710, acquiring schedule information managed by the schedule information managing unit 708, or receiving a notification (e.g., layout change notification) from an administrator or the like, for example.

The control selecting unit 706 selects (determines) a control to be implemented with respect to each output apparatus 102 based on the event information collected by the event information collecting unit 705 and the corresponding control stored in the corresponding information 713. The control selecting unit 706 may be implemented by a program executed by the CPU 301 of FIG. 3, for example.

For example, with reference to FIG. 9A, when a fire occurs, if the output apparatus ID "SP0002" is included in the sender information acquired from the information terminal 104 of a general customer, "route information to Exit B" is selected as the providing information to be provided to the information terminal 104 corresponding to the sender of the sender information.

The output apparatus control unit 707 implements the control selected by the control selecting unit 706 with respect to the corresponding output apparatus 102. The output apparatus control unit 707 may be implemented by a program executed by the CPU 301 of FIG. 3, for example.

For example, the output apparatus control unit 707 may send predetermined control information indicating the selected control to the corresponding output apparatus 102 via the gateway 103 to implement the selected control with respect the corresponding output apparatus 102.

The schedule information managing unit 708 manages schedule information of a pre-set schedule, such as a schedules layout change date, a store opening time, a store closing time, late evening time, and the like. The schedule information managing unit 708 may be implemented by a program executed by the CPU 301 of FIG. 3, for example.

The app providing unit 709 provides the app for the information terminal 104 for implementing the information processing system 100 to the information terminal 104. The app providing unit 709 may be implemented by a program executed by the CPU 301 of FIG. 3, for example.

(Functional Configuration of Output Apparatus)

The output apparatus 102 includes a wireless communication unit 721, a sound wave output unit 722, an output control unit 723, an apparatus information storage unit 724, a detection unit 725, a sound wave acquiring unit 726, and a status information transmitting unit 727.

The wireless communication unit 721 establishes wireless communication with the gateway 103. The wireless communication unit 721 may be implemented by the wireless communication unit 404 and a program executed on the CPU 401 of FIG. 4, for example. The wireless communication unit 721 enables the output apparatus 102 to exchange data with the management server 101 via the gateway 103.

The sound wave output unit 722 outputs a sound wave including apparatus information of the output apparatus 102 (e.g., output apparatus ID and/or position information of the output apparatus 102). In the following descriptions, it is assumed that the apparatus information of the output apparatus 102 includes the output apparatus ID of the output apparatus 102. Note that the sound wave output unit 722 may be implemented by the audio control unit 405, the audio output unit 406, and a program executed by the CPU 401 of FIG. 4, for example.

The output control unit 723 controls output operations of the output apparatus 102 based on an instruction for a specific control (control information) from the management server 101. For example, based on the control information from the management server 101, the output control unit 723 may implement on/off control of a sound wave output by the sound wave output unit 722, control the output intensity level of the sound wave, or control the sound wave output unit 722 to output a specified audible sound.

The apparatus information storage unit 724 stores output apparatus information, such as the output apparatus ID to be included in the sound wave to be output by the sound wave output unit 722 and/or the position information of the output apparatus 102. The apparatus information storage unit 724 may be implemented by the flash ROM 403 of FIG. 4, for example. Note that the apparatus information, such as the output apparatus ID, stored in the apparatus information storage unit 724 may correspond to pre-set information stored in the output apparatus 102, or information designated by the management server 101, for example.

The detection unit 725 detects information relating to the environment of the output apparatus 102. The detection unit 725 may be implemented by the sensor unit 408 and a program executed by the CPU 401 of FIG. 4, for example. The information detected by the detection unit 725 may include information detected by a moving object sensor, an occupancy sensor, or the like. The information detected by the detection sensor 725 may include various other types of detection information, such as temperature, humidity, brightness, and/or smoke detection information, for example.

The sound wave acquiring unit 726 acquires information relating to sound waves around the output apparatus 102. The sound wave acquiring unit 726 may be implemented by the audio acquiring unit 407, the audio control unit 405, and a program executed by the CPU 401 of FIG. 4, for example. The sound wave acquiring unit 726 may acquire information, such as the ambient sound level around the output apparatus 102 and predetermined information included in a sound wave output by an information terminal 104, for example.

The status information transmitting unit 727 transmits status information including apparatus information of the output apparatus 102, and information indicating a status of the output apparatus 102 to the management server 101, for example. The status information transmitting unit 727 may be implemented by a program executed by the CPU 401 of FIG. 4, for example.

Note that the status information transmitting unit 727 may be configured to transmit the status information in response to a request (e.g., poll) from the management server 101, for example. Alternatively, the status information transmitting unit 727 may be configured to transmit the status information according to a predetermined condition (e.g., at predetermined time intervals, in response to a change in status, or the like).

(Functional Configuration of Information Terminal)

The information terminal 104 includes a communication unit 731, a sound wave acquiring unit 732, an information extracting unit 733, an identification information transmitting unit 734, an identification information storage unit 735, a providing information receiving unit 736, a display control unit 737, a display/input unit 738, an audio output unit 739, and a vibration generating unit 740.

The communication unit 731 connects the information terminal 104 to the network 106, and enables the information terminal 104 to exchange data with the management server 101 or the like. The communication unit 731 may be implemented by the communication I/F unit 605 and a program executed on the CPU 601 of FIG. 6, for example.

The sound wave acquiring unit 732 acquires a sound wave output from the output apparatus 102. The sound wave acquiring unit 732 may be implemented by the microphone unit 607 and a program executed by the CPU 601 of FIG. 6, for example.

The information extracting unit 733 extracts information included in the sound wave acquired by the sound wave acquiring unit 732. The information extracting unit 733 may be implemented by a program executed by the CPU 601 of FIG. 6, for example. The information extracting unit 733 may extract information, such as the output apparatus ID of the output apparatus 102, for example.

The identification information transmitting unit 734 transmits sender identification information (e.g., app ID) that is stored in the identification information storage unit 735 and the output apparatus ID of the output apparatus 102 extracted by the information extracting unit 733 to the management server 101 via the communication unit 731. The identification information transmitting unit 734 may be implemented by a program executed by the CPU 601 of FIG. 6, for example.

The identification information storage unit 735 stores sender identification information, such as the app ID of the app that is run on the information terminal 104 corresponding to the sender of sender information. The app ID may correspond to app identification information that is generated by the app run on the information terminal 104 for implementing the information processing system 100 when the app is first installed in the information terminal 104, for example. The app run on the information terminal 104 may generate a unique app ID with respect to each information terminal 104 based on unique identity information of the information terminal 104, such as the IMEI (International Mobile Equipment Identity), for example. Alternatively, the app ID may correspond to a unique app ID that is assigned to the app run on the information terminal 104 when the app is downloaded from the app providing unit 709 of the management server 101, for example. Note that the app ID may also be generated in other various ways.

The providing information receiving unit 736 may receive providing information (e.g., position information) from the management server 101 via the communication unit 731, for example. The providing information receiving unit 736 may be implemented by a program executed by the CPU 601 of FIG. 6, for example.

The display control unit 737 controls the display/input unit 738 to display a display screen based on the providing information received by the providing information receiving unit 736. The display control unit 737 may be implemented by a program executed by the CPU 601 of FIG. 6, for example.

The display/input unit 738 displays a display screen based on the received providing information, under the control of the display control unit 737, for example, and accepts input operations from the user. The display/input unit 738 may be implemented by the display/input unit 609 of FIG. 6, for example.

The audio output unit 739 outputs a sound wave including predetermined information based on user information registered when the user of the information terminal 104 installs an app for implementing the information processing system 100, for example. The registered user information may be information indicating that the user of the information terminal 104 is visually impaired, for example. In such case, the audio output unit 739 may output a sound wave including predetermined information (e.g., app ID of app run on the information terminal 104). The audio output unit 739 may be implemented by the speaker unit 608 and a program executed by the CPU 601 of FIG. 6, for example.

The vibration generating unit 740 outputs a vibration in a case where the providing information received by the providing information receiving unit 736 includes an instruction to output a vibration, for example.

<Process Flow>

In the following, example process operations of the information processing system 100 are described.

FIG. 14 is a flowchart illustrating an example process operation of the management server 101 according to an embodiment of the present invention.

In step S1401, the status information acquiring unit 703 of the management server 101 acquires status information from the output apparatus 102.

In step S1402, the event information collecting unit 705 of the management server 101 collects event information relating to a predetermined event that is occurring.

In step S1403, the event information collecting unit 705 of the management server 101 determines whether there is a predetermined event that is currently occurring. If no predetermined event is currently occurring, the management server 101 returns to step S1401 and repeats the same process. On the other hand, if there is a predetermined event that is currently occurring, the management server 101 proceeds to step S1404.

Upon proceeding to step S1404, the control selecting unit 706 of the management server 101 selects the control to be implemented with respect to the output apparatus 102 based on the event information collected by the event information collecting unit 705.

For example, the control selecting unit 706 of the management server 101 may extract the corresponding control to be implemented with respect to the output apparatus 102 from the corresponding information 713 shown in FIGS. 12A-13B according to the predetermined event that is currently occurring.

As one specific example, in a case where the predetermined event that is currently occurring is "detection of predetermined information (point 1)", the control selecting unit 706 may refer to the corresponding information 713 shown in FIG. 13B, and extract "output on by audible sound" stored in association with the output apparatus 102 located at point 1 (with the output apparatus ID "SP0001") as the control to be implemented with respect to the corresponding output apparatus 102.

In step S1405, the output apparatus control unit 707 instructs the corresponding output apparatus 102 to implement the control selected by the control selecting unit 706. For example, the output apparatus control unit 707 may send predetermined control information instructing the implementation of the control selected by the control selecting unit 706 to the corresponding output apparatus 102.

In the following, an example overall process flow of the information processing system 100 is described.

FIG. 15 is a sequence chart showing an example process operation of the information processing system 100 according to an embodiment of the present invention.

In step S1501, the sound wave acquiring unit 726 of the output apparatus 102a acquires a sound wave including predetermined information (app ID) that is output by the information terminal 104.

In step S1502, the sound wave acquiring unit 726 of the output apparatus 102a extracts the predetermined information (app ID) included in the acquired sound wave.

In steps S1503 and S1504, the management server 101 sends status information acquisition requests to the output apparatus 102a and the output apparatus 102b. The status information acquisition request may include the output apparatus ID of the corresponding output apparatus 102a/102b, for example. Note that in the present example, it is assumed that the management server 101 is configured to send the status information acquisition requests to the output apparatuses 102a and 102b at predetermined time intervals (e.g., every 15 seconds), for example.

In step S1505, in response to the status information acquisition request received from the management server 101, the status information transmitting unit 727 of the output apparatus 102a sends status information including the predetermined information (app ID) extracted in step S1502 to the management server 101. Note that the status information sent by the output apparatus 102a may also include the output apparatus ID "SP0001" of the output apparatus 102a, for example.

In step S1506, in response to the status information acquisition request received from the management server 101, the status information transmitting unit 727 of the output apparatus 102b sends status information of the output apparatus 102b to the management server 101. Note that the status information sent by the output apparatus 102b may also include the output apparatus ID "SP0002" of the output apparatus 102b. Note, also, that the status information sent by the output apparatus 102b does not include predetermined information (app ID).

In step S1507, the event information collecting unit 705 of the management server 101 collects event information relating to a predetermined event that is currently occurring. If there is a predetermined event that is currently occurring, the event information collecting unit 705 proceeds to step S1508 and subsequent process steps. Note that the process of step S1507 corresponds to the processes of step S1402 and S1403 of FIG. 14.

In step S1508, the control selecting unit 706 of the management server 101 selects corresponding controls to be implemented with respect to the output apparatuses 102a and 102b based on the corresponding information shown in FIG. 13B. According to the corresponding information shown in FIG. 13B, when the event "detection of predetermined information (point 1)" is occurring, "output on by audible sound" is the corresponding control to be implemented with respect to the output apparatus 102a with the output apparatus ID "SP0001". Thus, the control selecting unit 706 selects the corresponding control from the corresponding information shown in FIG. 13B.

In step S1509, the output apparatus control unit 707 of the management server 101 sends control information indicating the corresponding control selected by the control selecting unit 706 to the output apparatus 102a. The control information may include the output apparatus ID of the output apparatus 102a and information indicating the selected control to be implemented with respect to the output apparatus 102a ("output on by audible sound" in the present example), for example.

In a preferred embodiment, the control information also includes audible sound data to be output by the output apparatus 102a (audio data of information provided by the management server 101).

In step S1510, based on the received control information, the output control unit 723 of the output apparatus 102a controls the sound wave output unit 722 to output an audible sound.

In this way, the management server 101 instructs the output apparatus 102a to implement a predetermined control in response to a predetermined event that is occurring. That is, according to an aspect of the present invention, the management server 101 (as an example of an information processing apparatus) may easily control each output apparatus 102 according to a predetermined event that is currently occurring in the information processing system 100 including a plurality of output apparatuses 102 that output a predetermined signal.

Other Embodiments

Although the present invention has been described above with reference to certain illustrative embodiments, the present invention is not limited to these embodiments, and numerous variations and modifications may be made without departing from the scope of the present invention.

For example, the output apparatus 102 of the information processing system 100 described above outputs a sound wave as a predetermined signal, the signal output by the output apparatus 102 is not limited thereto. For example, the output apparatus 102 may output a radio wave based on Bluetooth (registered trademark), BLE (Bluetooth Low Energy), or short-range wireless communication, for example.

Also, in the above-described embodiments, the detection range, within which a signal output by the output apparatus 102 can be detected, is adjusted by controlling the output intensity level of the signal output by the output apparatus 102. However, the detection range may also be adjusted by controlling the output direction of the signal output by the output apparatus 102. For example, the output apparatus 102 may include a plurality of output devices (speakers, antennas, etc.) that output a signal in a plurality of directions and the output direction of the output signal may be adjusted by tuning on/off the plurality of output devices.

Further, note that in some embodiment, at least a part of the information stored in the storage unit 710 of the management server 101 shown in FIG. 7 may be stored in an external server or the like, for example.

What is claimed is:

1. An information processing apparatus that controls a plurality of output apparatuses that are configured to output a predetermined signal and that are each installed at a predetermined position, the information processing apparatus comprising:
    a hardware processor; and
    a hardware memory storing a program that, upon execution by the hardware processor, causes the hardware processor to:
        store corresponding information associating a predetermined event with apparatus information of an output apparatus, among the plurality of output apparatuses, and a control to be implemented with respect to the output apparatus, the output apparatus outputting a predetermined signal as a sound wave that includes identification information of the output apparatus;
        collect event information relating to the predetermined event that is occurring around the predetermined position of the output apparatus, and environmental information detected by the output apparatus, the environmental information relating to the environment around the predetermined position of the output apparatus;
        select control information of the control to be implemented with respect to the output apparatus based on the collected event information and the collected environmental information; and
        instruct the output apparatus to implement the selected control information.

2. The information processing apparatus according to claim 1, wherein the hardware memory further includes instructions that, when executed by the hardware processor, cause the hardware processor to
        acquiring status information including the apparatus information of the output apparatus and information indicating a status of the output apparatus; and
    wherein the predetermined event corresponds to acquiring the status information that includes information indicating a predetermined status or a predetermined combination of statuses of the output apparatus.

3. The information processing apparatus according to claim 1, wherein
    the plurality of output apparatuses are installed at predetermined positions that differ from one another; and
    the predetermined signal output by the output apparatus includes the apparatus information of the output apparatus.

4. The information processing apparatus according to claim 1, wherein
    the control to be implemented with respect to the output apparatus includes adjusting a detection range within which the predetermined signal output by the output apparatus can be detected.

5. The information processing apparatus according to claim 4, wherein
    the control for adjusting the detection range includes adjusting an intensity of the predetermined signal output by the output apparatus.

6. The information processing apparatus according to claim 4, wherein
    the control for adjusting the detection range includes adjusting an output direction of the predetermined signal output by the output apparatus.

7. The information processing apparatus according to claim 4, wherein
    the control to be implemented with respect to the output apparatus includes switching between turning on and turning off the output of the predetermined signal output by the output apparatus.

8. An information processing method implemented by an information processing apparatus that controls a plurality of output apparatuses that are configured to output a predetermined signal and that are each installed at a predetermined position, the information processing method comprising steps of:
    storing corresponding information associating a predetermined event with apparatus information of an output apparatus, among the plurality of output apparatuses, and a control to be implemented with respect to the output apparatus, the output apparatus outputting a predetermined signal as a sound wave that includes identification information of the output apparatus;
    collecting event information relating to the predetermined event that is occurring around the predetermined position at which of the output apparatus, and environmental information detected by the output apparatus, the environmental information relating to the environment around the predetermined position of the output apparatus;
    selecting control information of the control to be implemented with respect to the output apparatus based on the collected event information and the detected environmental information; and
    instructing the output apparatus to implement the selected control.

9. The information processing apparatus according to claim 1, wherein the hardware memory further includes instructions that, when executed by the hardware processor, cause the hardware processor to receive, from a terminal device connected to the information processing apparatus via a network, terminal device information that includes
sender identification information identifying the terminal device, and
the identification information of the output apparatus extracted by the terminal device from the predetermined signal output by the output apparatus.

10. The information processing method according to claim 8, wherein the method further comprises:
receiving, from a terminal device connected to the information processing apparatus via a network, terminal device information that includes
sender identification information identifying the terminal device, and
the identification information of the output apparatus extracted by the terminal device from the predetermined signal output by the output apparatus.

11. The information processing apparatus according to claim 1, wherein the collected environmental information includes at least one of motion, temperature, humidity, brightness, and sound information.

12. The information processing method according to claim 8, wherein the collected environmental information includes at least one of motion, temperature, humidity, brightness, and sound information.

* * * * *